Feb. 11, 1941.	C. J. HUGHEY	2,231,719
COLOR FILTER HOLDER
Filed June 17, 1939
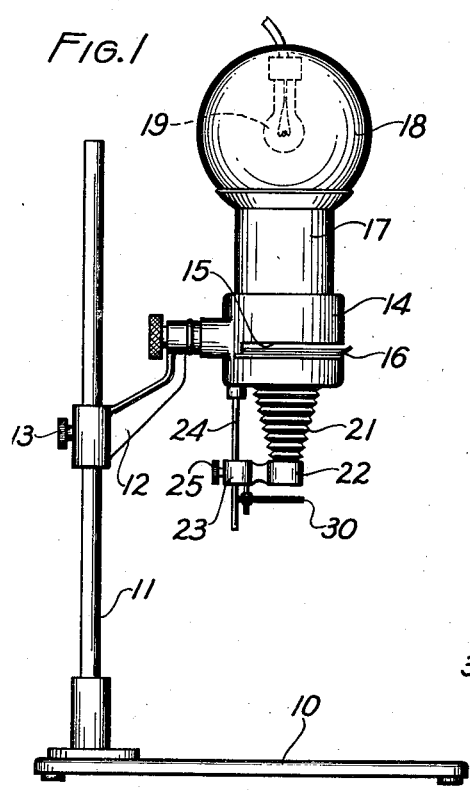
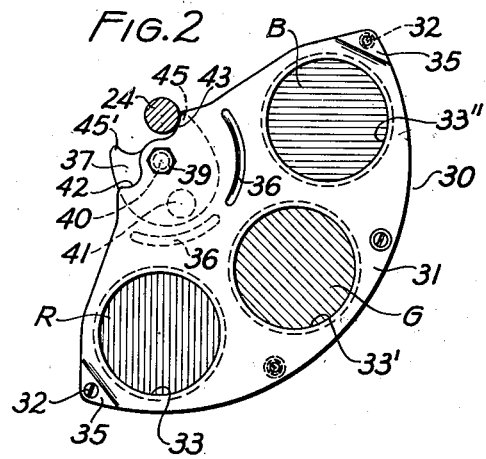
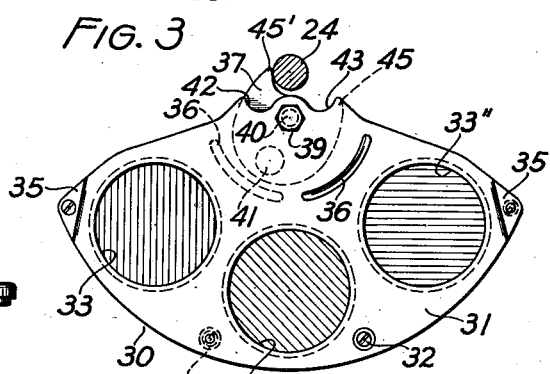
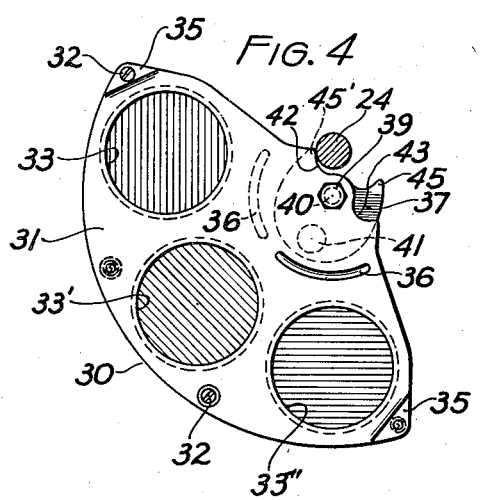
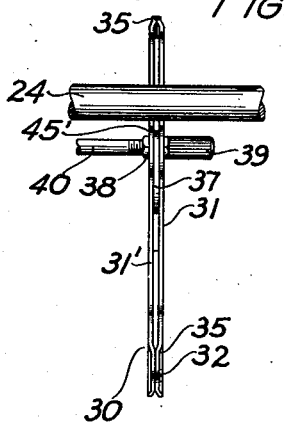
CARTER J. HUGHEY
INVENTOR
BY
ATTORNEYS Patented Feb. 11, 1941

2,231,719

UNITED STATES PATENT OFFICE 2,231,719

COLOR FILTER HOLDER

Carter J. Hughey, Rochester, N. Y., assignor to Eastman Kodak Company, Rochester, N. Y., a corporation of New Jersey Application June 17, 1939, Serial No. 279,729

9 Claims. (Cl. 240—3.1)

The present invention relates to filter holders including more than two color filters which are adapted to be moved successively into alignment with a beam of light projected by a projection apparatus upon movement of the filter holder as a whole, and particularly to a filter holder of this type including a positioning arrangement which serves to positively, or frictionally, position the respective color filters carried thereby in proper alignment with the projected beam of light when the holder is moved so that the operator does not have to watch the relative positions of the filters and the beam of light to be sure the individual filters are in proper covering relation with the beam of light.

Filter holders having a plurality of different colored filters which are adapted to be successively moved into alignment with a projected beam of light by movement of the holder are common in the prior art. It is also known to provide means for definitely locating the respective filters carried by such a holder in proper alignment with a projected beam of light upon movement of the holder through a given path, such means giving the operator an indication of the proper location of the respective holders, or positively limiting movement of the holders with given filters in proper position. One known filter holder and locating means of this type includes a stationary finger on the apparatus projecting the beam of light, which spring finger rides on the periphery of the holder and snaps into notches located in said periphery in proper relation to the several filters carried thereby. With this particular arrangement, as well as with others found in the prior art, the filter holder itself does not include the filter positioning means so that it can be sold as an accessory and applied to known projection apparatus, because of required parts, i. e., spring fingers, which are not ordinarily a part of the apparatus unless it is designed to accommodate a filter holder of this type.

Therefore, one object of the present invention is to provide a tri-colored filter holder which includes positioning means for definitely locating, or indicating when, certain of the individual filters carried thereby are in alignment with a beam of light projected by an apparatus on which it is movably mounted. Another object is to provide a filter holder of the type described particularly designed for photographic enlargers, and which itself includes the necessary filter positioning means so that it can be mounted on known types of enlargers without necessitating the addition to the enlarger of a part not ordinarily found thereon. And still another object is to provide a filter holder of the type described which is simple in construction, and in which the filter positioning means is so incorporated thereon as to be practically unnoticeable. And yet another object is to provide a tri-color filter holder of the type described which in combination with a known photographic enlarger will definitely limit the extreme filters in proper position depending upon the direction of movement, and will indicate the proper position of the intermediate filter regardless of the direction of movement of the filter. And still another object is to provide a tri-color filter of the type described in which spaced stops integral with the holder itself serve to positively limit movement thereof with two of the filters in proper position, and in which a positioning member in frictional engagement with the holder serves to indicate when the third filter is in proper position.

The novel features that I consider characteristic of my invention are set forth with particularity in the appended claims. The invention itself, however, both as to its organization and its methods of operation, together with additional objects and advantages thereof, will best be understood from the following description of a specific embodiment when read in connection with the accompanying drawing in which—

Fig. 1 shows a side elevation of a known type of photographic enlarger with a filter holder constructed in accordance with the preferred embodiment of the present invention mounted thereon in operative position, Fig. 2 is a plan view of the filter holder in conjunction with the focusing post of the enlarger, shown in section, with which it cooperates, and moved to a position wherein one extreme filter is in alignment with the projected light beam of the enlarger, Fig. 3 is similar to Fig. 2, but showing the filter holder moved to a position where the intermediate filter is in alignment with the projected light beam of the enlarger.

Fig. 4 is similar to Fig. 2, but showing the filter holder moved to a position in which the other extreme filter is in operative position, and Fig. 5 is a side elevation of the filter holder and the focusing post of the enlarger.

Like reference characters refer to corresponding parts throughout the drawing.

While filter holders of this type may be used for many purposes, the one disclosed was designed for use in, and will be described in connection with, a step in a well known process of making three-color prints on paper from a color transparency, such as a Kodachrome transparency. The first step in the production of a color print from a Kodachrome transparency, and the only step in which the present filter holder takes a part, is the making of the color separation negative from the transparency. This step comprises projecting the transparency onto a suitable film, and making a negative first by projecting the transparency through a red filter, then making another negative through a green filter, and finally making one through a blue filter. These negatives are then printed onto a special and well-known wash-off relief film, which when properly treated form three matrices which when properly dyed and superimposed on a special paper give the final color prints.

Inasmuch as Kodachrome transparencies are usually of the 35-mm. size, in order to make a good sized finished print, i. e. 8" x 10", an enlargement of a Kodachrome transparency is required. This enlargement usually takes place in the step of making the color separation negatives, hence the filter holder constituting the present invention is used in conjunction with the enlarger for making these enlarged color separation negatives.

The filter holder constituting the present invention may be used in any known type of photographic enlarger, or for that matter with known types of projection apparatus in which a colored beam of light is desired. For the purpose of illustration only, therefore, referring to Fig. 1, a known type of enlarger with which this holder is adapted to be used, may comprise a base 10 which may be large enough to constitute a paper easel for the sensitive paper or film. Extending vertically from, and fixed to the base, is a post 11 along which a supporting arm 12 may be adjusted and clamped by a clamping screw 13. The enlarger head as a whole may include a tubular portion 14 having a slot 15 extending transversely and partially therethrough, and which slot may constitute a negative carrier space into which a negative carrier 16 may be readily slid to locate a negative carrier thereby in proper enlarging position. Above the tubular portion 14 is located the condenser housing 17 and the lamphousing 18 in which a lamp 19 is situated.

To the bottom of the tubular portion 14, and covering the opening extending therethrough, is fixed one end of a bellows 21, the other end of said bellows being connected to the lens carrier 22 in a well-known manner, and for directing the projected image of the negative to a lens in the carrier without the entrance of extraneous light. The lens carrier 22 may include a portion 23 embracing a rod, or abutment, 24 extending downwardly from the bottom of the tubular portion 14, and along which rod said lens carrier may be adjusted for focusing purposes. The lens carrier may be locked in any given adjusted position of focus by a clamp screw 25. A filter holder 30 constructed in accordance with the present invention, and hereinafter fully described, may be pivotally mounted on the bottom of the lens carrier 22 so as to swing transversely across the optical axis of the projection lens for moving one of the three color filters carried thereby successively into alignment with the projected beam of light.

The particular photographic enlarger forms no part of the present invention except insofar as a part thereof cooperates with the filter holder hereinafter described, but is shown to point out that the filter holder constituting the present invention is adapted for use with enlargers of known types, without necessitating any consequential alterations in the enlarger itself.

Coming now to the present invention, and referring to Figs. 2-5, the filter holder indicated generally as 30 is shown as being fan-shaped, and is made up of two plates 31 and 31' fixed in parallel relation by screws 32 located adjacent the circular edge thereof and by a post and stud arrangement located at the center point of the circular edge, which post and stud arrangement will be fully described hereinafter. Each plate is provided with three equi-angularly spaced apertures 33, 33', and 33" so located that the apertures in one plate are in alignment with the apertures in the other plate, and each of these apertures has a diameter equal to, or slightly greater than, the diameter of the projection lens of the enlarger so that when any one aperture is moved into alignment with the projected light beam it will include the whole beam without cutting off any of the same.

Disposed between the plates 31 and 31' and in covering relation with the apertures therein are three different colored filters. One of the end filters may be blue, indicated by B, the intermediate filter may be green, indicated by G, and the other end filter will be red, indicated by R. It is to be understood that this particular choice of colors is illustrated due to the fact that the filter holder as described is adapted for making color prints from Kodachrome transparencies, and it is pointed out that the particular arrangement of the color filters or the color of said filters, forms no limitation to the present invention, because such a filter holder could be used for other purposes than making color prints by the method outlined above. These color filters are usually made of a material like Celluloid, cellulose acetate sheeting, or the like, and as well known, these materials have a tendency to stretch when placed in a light beam in which they become heated. For this reason it is undesirable to tightly clamp the filters between the plates of the filter holder, or to glue the same to one of the plates, because when placed in a light beam they become wrinkled due to the fact that they cannot expand when they become warm. It has been found that the filters will remain in their most flat condition if disposed more or less loosely between the plates 31 and 31' so that they can readily expand when situated in the light beam, and it is for this reason that the plates 31 and 31' are spaced apart so as to confine the filters loosely in place.

The spacing of the plates 31 and 31' of the filter holder will depend upon the thickness of the filter used, and may be effected in any suitable manner. For the purpose of clearly describing the particular manner used for spacing the plates 31 and 31' in the present instance let us assume that the filters to be used are .010 inch thick. With filter holders of this thickness, if the adjacent faces of the plates 31 and 31' are spaced .010 inch apart, then the filter will be more or less loosely held in place. Such a spacing of the plates may be effected by providing each plate at its extreme outer corner with a depression 35 having a .005 inch offset. Thus when the two plates are brought together, as shown, the depressions 35 on each plate will come face to face and will serve to space the major portion of the plates adjacent the circular edge of the filter .010 inch apart. To insure the entire adjacent faces of each of the plates being .010 inch apart, each plate 31 and 31' may be provided with an arcuate depression 36 .010 inch in depth displaced from one another so that they will not engage one another, but will engage the main surface of the opposing plate to hold the two spaced at .010 inch at all points in conjunction with the depressions 35.

A positioning member 37 in the form of a friction washer is located between the plates 31 and 31' and is held in place between said plates by a nut 38 and a stud 39 engaging a threaded end of a post 40 passing through apertures in each of the plates and the washer. The plates are adapted to rotate relative to the post 40 and the washer, which may be .010 inch thick, is adapted to rotate relative to the plates 31 and 31'. The post 40 which is a part of the filter holder may have a threaded end, not shown, adapted to fit into a tapped opening, not shown, in the portion 23 of the lens carrier 22 of the enlarger for mounting the holder on the enlarger adjacent and to one side of the lens to cooperate with the stationary abutment 24 when rotated transversely of the optical axis of the lens of the enlarger.

A considerable frictional engagement is provided between the plates and the washer to insure the washer normally moving with the plates when they are pivoted about the post 40, thus permitting a restrained relative movement between the plates and washer when movement of the washer is positively stopped. While any suitable means could be provided for setting up this frictional engagement, I have shown the washer provided with a boss 41 adapted to engage one of the plates 31 or 31'. In accordance with the measurements assumed for illustrating this invention, this boss may be in the neighborhood of .005 inch high making the total thickness of the washer at this point .015 inch in a .010 inch space.

The plates 31 and 31' are provided adjacent the pivot point thereof with a pair of engaging surfaces 42 and 43 which are adapted to alternately engage the focusing rod 24 of the enlarger when the holder is pivoted between its two extreme positions, and for positively limiting movement of the holder in these two extreme positions. The engaging surfaces 42 and 43 are so disposed relative to the red and blue filters and the rod 24 of the enlarger when mounted on said enlarger that the blue filter will be correctly positioned below the enlarger lens when engaging surface 42 engages the rod 24, see Fig. 4, and the red filter will be positioned below the lens when engaging surface 43 engages the rod 24 to limit movement of the holder in that direction, see Fig. 2. Looking at Figs. 2–4 of the drawing, the center line of the projection lens of the enlarger is vertically below the rod 24 and in vertical alignment with the pivot point of the filter holder.

Since the three different color filters are usually moved into operative position in succession, it is desirable to properly locate the intermediate, or green, filter in alignment with the lens, and to indicate such position when said filter is moved from either of its two extreme positions. To this end, the positioning member or washer 37 is provided with two spaced engaging surfaces or wings 45 and 45' which are adapted to extend into the path of the rod 24 to engage the same when the filter holder is pivoted in either direction. The wings 45 and 45' preferably have the same contour as the engaging surfaces 42 and 43 of the plates 31 and 31' for a purpose which will be clear from the following description of the function of said washer. Referring to Figs. 2–5 it will be noticed that the wings 45 and 45' on the washer 37 are so disposed relative to the engaging surfaces 42 and 43 of the plates that when either one of the extreme filters are in operative position, one of said wings will extend into the path of the rod 24 between the rod and the opposite engaging surface. Thus, when the filter holder is moved from one extreme position toward the other the plates and washer will pivot together until a wing on the washer engages the rod 24 after which further movement of the plates will be relative to the washer and must overcome the friction between the plates and the washer. The wings on the washer are so disposed relative to the engaging surfaces on the plates and the intermediate, or green, filter that when one of the two projecting wings of the washer engages the rod 24 the intermediate filter will be in operative position below the enlarger lens.

Referring again to Figs. 2–4 the operation of the filter holder will be described in moving from one extreme position to the other so that its operation will be entirely clear. Starting with Fig. 2, where the red filter is shown in operative position, it will be noticed that the engaging surface 43 of the plates 31 and 31' is against the rod 24 and the wing 45 of the washer 37 is contiguous with said engaging surface while the wing 45' is moved relative to the plates into a position intermediate the rod 24 and the engaging surface 42 of the plates. To position the intermediate filter in operative position, the plates are pivoted about the post 40 to the left, as viewed in Fig. 2. Due to the frictional engagement between the plates and the washer, the washer will move with the plates during their movement until the wing 45' thereof engages the rod 24 whereupon movement of the washer will be stopped and further movement of the plates relative thereto will necessitate an added force to overcome the frictional engagement between said plates and the washer. When the wing 45' first engages the rod 24 the intermediate filter will have been moved to its operative position and this fact will be apparent to the operator due to the added force required to move the plates past this point, see Fig. 3. Now to position the blue filter in operative position, the plates are moved further to the left and relative to the washer 37 until the engaging surface 42 of the plates engages rod 24 to positively limit movement of the plates, and in which position the wing 45' and the washer becomes contiguous with the engaging surface 42, see Fig. 4. In moving to this last position the plates 31 and 31' will move relative to the washer with the result that the engaging surface 43 thereof will be moved from contiguous relation with the wing 45 of the washer and said wing will extend into the path of the rod between the same and said engaging surface 43 to be in a position to engage the rod 24 and locate the intermediate filter in operative position when the filter holder is pivoted in the opposite direction. Thus it will be apparent that regardless of which direction the filter holder is moved in from one extreme position to the other one of the wings on the washer 37 will engage the rod 24 to locate and indicate when the intermediate filter is in operative position.

The present filter holder is designed so that it includes means for positioning the different filters carried thereby in operative relation to a projected beam of light when mounted on known types of enlargers, and is therefore adapted to be sold as an accessory for such enlargers. The novel positioning means incorporated in this filter holder insures a proper positioning of the intermediate filter in operative position regardless of in which direction the filter holder is moved, and also gives the operator a good indication of such a position of the intermediate filter. While this filter holder has been described as including certain color filters in a certain relation, it will be understood that any variety of colors could be used and in any relation, without going beyond the scope of the present invention. In addition, while this filter holder has been described in connection with a photographic enlarger it will be appreciated that it could be applied to any projection apparatus in which it might be desired to alter the color of the beam of light projected thereby by successively moving a plurality of different colored filters into the projected light beams to color the same.

Although I have shown and described a certain specific embodiment of my invention, I am fully aware that many modifications thereof are possible. My invention, therefore, is not to be restricted except insofar as is necessitated by the prior art and by the spirit of the appended claims.

Having thus described my invention what I claim is new and desire to secure by Letters Patent of the United States is:

1. As an article of manufacture for attachment to a projecting apparatus having an abutment and projecting a beam of light, a filter holder comprising a body member adapted to be movably mounted on said apparatus and carrying three color filters equally spaced from one another in a line and which are movable into alignment with said beam of light, two spaced engaging surfaces on said body member for alternately contacting said abutment to positively locate either of said end filters in said beam of light, and a positioning member movably mounted on said body member for restrained movement relative thereto, two spaced engaging surfaces on said positioning member for alternatively engaging said abutment depending upon the direction of movement of said body member, and for locating the intermediate filter in said beam of light.

2. As an article of manufacture for attachment to a projecting apparatus having an abutment and projecting a beam of light, a filter holder comprising a body member for pivotal mounting and carrying three colored filters which are equiangularly spaced and which are movable into alignment with said beam of light, and including two engaging surfaces for alternately contacting said abutment to locate either of the two extreme filters in said beam of light, and a positioning member movably mounted on said body member in frictional engagement therewith, also carrying two engaging surfaces for alternately engaging said abutment depending upon the direction of movement of said body member, and for locating the intermediate filter in said beam of light.

3. As an article of manufacture for attachment to a projecting apparatus having an abutment and projecting a beam of light, a filter holder comprising a body member for pivotal mounting and carrying three colored filters which are equi-angularly spaced and which are movable into alignment with said beam of light, and including two engaging surfaces for alternately contacting said abutment to locate either of the two extreme filters in said beam of light, and a positioning member frictionally engaging said body member and movable into either of two positions relative thereto, said positioning member also having two engaging surfaces only one of which is available in one position of said positioning member to engage said abutment and locate the intermediate filter in said beam of light while the other engaging surface coincides with one of the engaging surfaces on said body member.

4. As an article of manufacture for attachment to a projecting apparatus having an abutment and projecting a beam of light, a filter holder comprising two plates held together in spaced parallel relation for pivotal movement, each of said plates provided with three apertures equi-angularly spaced and located so that the apertures in one plate align with the apertures in the other plate and are adapted to be moved into alignment with said beam of light in succession, two spaced engaging surfaces on one of said plates for alternately contacting said abutment to locate either of the two extreme filters in said beam of light depending upon the direction of rotation of said plates, a positioning disc located between said plates and mounted for pivotal movement relative to said plates about their point of pivotal movement, means between said plates and said disc for setting up a frictional engagement there between, two spaced engaging surfaces on said disc for alternately engaging said abutment depending upon the direction of movement of said plates, and for locating the intermediate filter in said beam of light.

5. The combination with a projection apparatus including a projection lens and a rigid abutment located adjacent and to one side of said lens, of a filter holder, a plurality of filters carried by said holder and equally spaced from one another thereon, means for movably mounting said filter holder adjacent said lens whereby each of said filters is adapted to be moved transversely across the optical axis of said lens in succession, and means movably and frictionally mounted on said filter holder and adapted to engage said abutment when said filter holder is moved for periodically arresting movement of said holder in positions wherein successive filters are definitely located in the optical axis of said lens.

6. The combination with a projection apparatus including a projection lens and a stationary abutment located adjacent and to one side of said lens, of a filter holder, three filters carried by said holder and equally spaced from one another thereon, means for oscillatably mounting said filter holder adjacent said lens whereby each of said filters is adapted to be moved transversely across the optical axis of said lens in succession, and means integral with said filter holder and adapted to engage said abutment when said filter holder is moved to positively limit movement of said holder in positions wherein either one of the end filters of three is located in the optical axis of the lens, and means movably and frictionally mounted on said filter to restrain movement of the filter in either direction of movement past the position wherein the intermediate filter is in the optical axis of said lens.

7. The combination with a projection apparatus including a projection lens and a stationary abutment located adjacent and to one side of said lens, of a filter holder, three filters carried by said holder and equally spaced from one another thereon, means for oscillatably mounting said filter holder adjacent said lens whereby each of said filters is adapted to be moved transversely across the optical axis of said lens in succession, a pair of spaced projections on said filter holder extending into the path of said abutment, one of said projections adapted to engage said abutment when the filter holder is moved in each direction to limit movement thereof with one of said end filters in the optical axis of the lens, a locating member mounted on said filter holder for restrained movement relative thereto, and including a pair of spaced projections extending into the path of said abutment, and displaced relative to said projections on said filter holder whereby when one of the same is contiguous with one of the projections on said filter holder in one extreme position of said filter holder the other is adapted to be moved to position intermediate said abutment and said other projection on the filter holder, and said locating projections displaced relative to said filters whereby the intermediate filter is adapted to be located in the optical axis of said lens when one of said locating projections first engages said abutment.

8. The combination with a projection apparatus including a projection lens and a stationary abutment located adjacent and to one side of said lens, of a filter holder, three filters carried by said holder and equally spaced from one another thereon, means for oscillatably mounting said filter holder adjacent said lens whereby each of said filters is adapted to be moved transversely across the optical axis of said lens in succession, and means integral with and movably mounted on said filter holder and adapted to engage said abutment when said filter holder is moved to positively limit movement of said holder in positions wherein either one of the end filters of three is located in the optical axis of the lens, and to restrain movement of the filter in either direction of movement past the position wherein the intermediate filter is in the optical axis of said lens, said means including a pair of spaced projections on said filter holder, each one of which is adapted to engage said abutment to positively limit the movement of the filter holder in one direction and with one of the extreme filters in the optical axis, a locating disc mounted on said filter holder for movement therewith and relative thereto, means for setting up a frictional engagement between said disc and said filter holder for restraining relative movement between the two, and a pair of spaced wings on said disc extending into the path of said abutment to engage the same when said filter holder is moved, said wings disposed relative to the projections on said filter holder and the filters whereby one of said wings is normally located intermediate one of said projections and said abutment and is adapted to engage said stop member during movement of said filter holder at the instant the intermediate filter is situated in the optical axis of the lens.

9. The combination with a projection apparatus including a projection lens and a stationary abutment located adjacent and to one side of said lens, of a filter holder comprising two plates each provided with three apertures in equi-angular spaced relation, said plates spaced apart in parallel relation with the apertures in one in alignment with the apertures in the other, a filter positioned between said plates in covering relation with each pair of aligned apertures, means for pivotally mounting said filter holder on said apparatus adjacent said lens whereby each of said filters is adapted to be moved transversely across the optical axis of the lens in succession, a pair of spaced projections on said filter holder, one of which is adapted to engage said abutment to limit the movement of said filter holder in each direction for positively locating one of said extreme filters in the optical axis of the lens, and means for restraining movement of said filter holder when it passes the point where the intermediate filter is in the optical axis of the lens to indicate such a position of said filter holder, said means including a locating disc pivotally mounted between said plates to move therewith and relative thereto, means for setting up a frictional engagement between said disc and said plates to restrain relative movement of the two, said disc including a pair of spaced wings, each one of which is adapted to be alternately moved into and out of the path of said abutment, and intermediate the same and one of said projections when said filter holder is moved to one of its extreme positions, said wings disposed relative to said projections and said filters whereby the intermediate filter is adapted to be located in the optical axis of said lens when either one of said wings is brought into engagement with said abutment by movement of said filter.

CARTER J. HUGHEY.